United States Patent
Suzuki et al.

(10) Patent No.: US 8,991,563 B2
(45) Date of Patent: Mar. 31, 2015

(54) DISK BRAKE AND METHOD OF PRODUCING THE SAME

(75) Inventors: Shinji Suzuki, Kanagawa (JP); Takahiro Tokunaga, Kanagawa (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 297 days.

(21) Appl. No.: 12/793,916

(22) Filed: Jun. 4, 2010

(65) Prior Publication Data
US 2010/0307874 A1 Dec. 9, 2010

(30) Foreign Application Priority Data
Jun. 8, 2009 (JP) ................. 2009/137328

(51) Int. Cl.
*F16D 55/18* (2006.01)
*F16D 55/22* (2006.01)
*F16D 55/00* (2006.01)
*F16D 121/02* (2012.01)

(52) U.S. Cl.
CPC .......... *F16D 55/22* (2013.01); *F16D 2055/002* (2013.01); *F16D 2121/02* (2013.01); *F16D 2250/0076* (2013.01)
USPC ........................................ 188/72.4; 188/73.1

(58) Field of Classification Search
USPC ............... 188/71.1, 72.4, 73.1, 73.43, 73.44, 188/73.45, 72.1, 72.5; 285/92
See application file for complete search history.

(56) References Cited

U.S. PATENT DOCUMENTS

| | | | | |
|---|---|---|---|---|
| 3,243,017 A | * | 3/1966 | Kleinstuck | 188/72.3 |
| 3,396,824 A | * | 8/1968 | Meier | 188/72.5 |
| 3,497,038 A | * | 2/1970 | Anders et al. | 188/370 |
| 3,517,782 A | * | 6/1970 | Hayes | 188/152 |
| 4,844,206 A | * | 7/1989 | Casey | 188/18 A |
| 5,228,725 A | * | 7/1993 | Aoyagi et al. | 285/141.1 |
| 6,223,867 B1 | * | 5/2001 | Doi et al. | 188/73.45 |
| 6,652,006 B1 | * | 11/2003 | Digiacomo | 285/92 |
| 7,370,737 B2 | * | 5/2008 | Iwasaki | 188/73.45 |
| 8,281,905 B2 | * | 10/2012 | Kang | 188/72.4 |
| 2006/0175156 A1 | | 8/2006 | Sato et al. | |
| 2008/0289916 A1 | * | 11/2008 | Sato et al. | 188/151 R |
| 2009/0101454 A1 | * | 4/2009 | Nanri et al. | 188/73.47 |

FOREIGN PATENT DOCUMENTS

GB 2012012 A * 7/1979 ........... F16D 55/228
JP 2007-10136 1/2007

* cited by examiner

*Primary Examiner* — Nicholas J Lane
(74) *Attorney, Agent, or Firm* — Wenderoth, Lind & Ponack, LLP

(57) ABSTRACT

A disk brake and a method of making the disk brake capable of improving the efficiency of manufacturing a caliper. A bottom portion (41) of a bore (40) is formed by integrally welding an opening surrounding portion at the bottom portion side of a cylinder portion (35) and a bottom cover member (92) fitted to the opening surrounding portion by friction stir welding. The bottom cover member is formed into a disk shape, and provided with a protrusion (68) at one surface side facing the interior of the bore. An inflow hole (58), for a supply of a fluid pressure into the bore, is formed within the range of the protrusion to establish communication between an interior surface (71) of the protrusion and an outer surface (63) of the bore.

11 Claims, 11 Drawing Sheets

US 8,991,563 B2

DISK BRAKE AND METHOD OF PRODUCING THE SAME

BACKGROUND OF THE INVENTION

The present invention relates to a disk brake and a method of making the same.

There is known a disk brake including a caliper prepared by integrally welding a bottom cover member to the bottom of the bore of the cylinder by friction stir welding (for example, refer to Japanese Patent Public Disclosure No. 2007-10136).

SUMMARY OF THE INVENTION

Some calipers of disk brake include an inflow hole for a supply of a fluid pressure formed at the bottom of the bore of the cylinder. Application the above-mentioned friction stir welding to a caliper having such a configuration may result in an impaired manufacturing efficiency.

Therefore, an object of the present invention is to provide a disk brake and a method of making the disk brake capable of improving the efficiency of manufacturing a caliper.

To achieve the foregoing object, in a disk brake according to the present invention, a bottom cover member, which is fitted to an opening surrounding portion of a cylinder portion and integrally welded thereto by friction stir welding, is formed into a disk shape, and provided with a protrusion formed at one surface side facing the interior of a bore, and an inflow hole for a supply of a fluid pressure into the bore formed within the range of the protrusion to establish communication between the one surface and the other surface.

A method of making a disk brake according to the present invention comprises: preparing a caliper body main part comprising a cylinder portion with openings at the both ends, and a bridge portion extending at the radially outer side of the cylinder portion along the axial direction thereof to straddle a disk; preparing a bottom cover member formed into a disk shape and provided with a protrusion at one surface side; integrally welding the bottom cover member to an opening surrounding portion at the bottom side of the cylinder portion by friction stir welding, with the protrusion disposed inside of the cylinder portion; and forming an inflow hole at the bottom cover member welded to the caliper main body by cutting, the inflow hole being formed within the range of the protrusion to establish communication between the one surface and the other surface.

DETAILED DESCRIPTION OF THE INVENTION

Hereinafter, embodiments of the present invention will be described with reference to the accompanying drawings.

First Embodiment

A first embodiment of the present invention will now be described with reference to FIGS. 1 to 10.

A disk brake according to the first embodiment is a disk brake for braking a four-wheeled vehicle. The drawings illustrate a disk brake installed on one of the left side and the right side of a vehicle. A disk brake installed on the other of the left side and the right side of a vehicle has a mirror-symmetrical configuration thereto.

Figure 1:
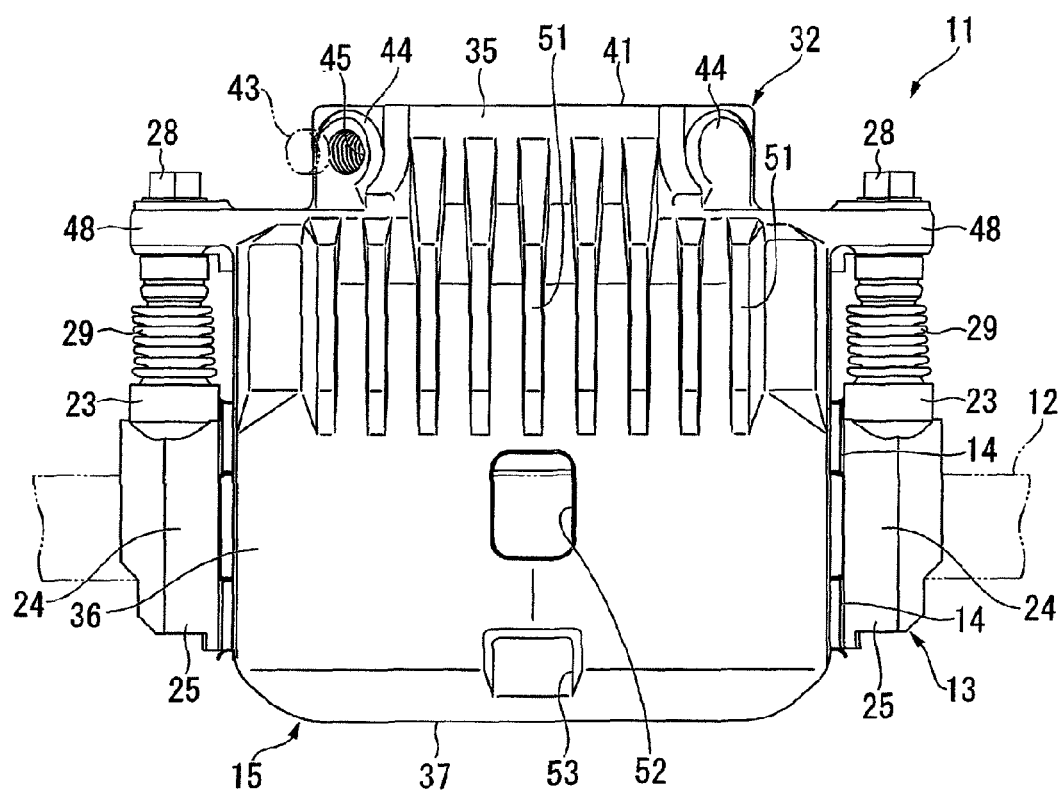
FIG. 1 is a plan view illustrating a disk brake according to a first embodiment of the present invention.

As shown in FIG. 1, the disk brake 11 comprises a carrier 13, a pair of brake pads 14, and a caliper 15. The carrier 13 is disposed so as to extend over the radially outer side of a disk 12 configured to rotate along with a not-shown wheel (rotator) to which a braking force is applied, and is fixed to a non-rotational portion of the vehicle. The pair of brake pads 14 is supported by the carrier 13 so as to be slidable in the axial direction of the disk 12 while being disposed at the respective sides of the disk 12 to face each other. The caliper 15 is supported by the carrier 13 so as to be slidable in the axial direction of the disk 12 while being disposed so as to extend over the radially outer side of the disk 12. The caliper 15 presses the brake pads 14 against the disk 12, thereby applying frictional resistance to the disk 12. In the following, the term "disk radial direction" is used to refer to the radial direction of the disk 12, the term "disk axial direction" is used to refer to the axial direction of the disk 12, and the term "disk rotational direction" is used refer to the rotational direction of the disk 12.

Figure 2:
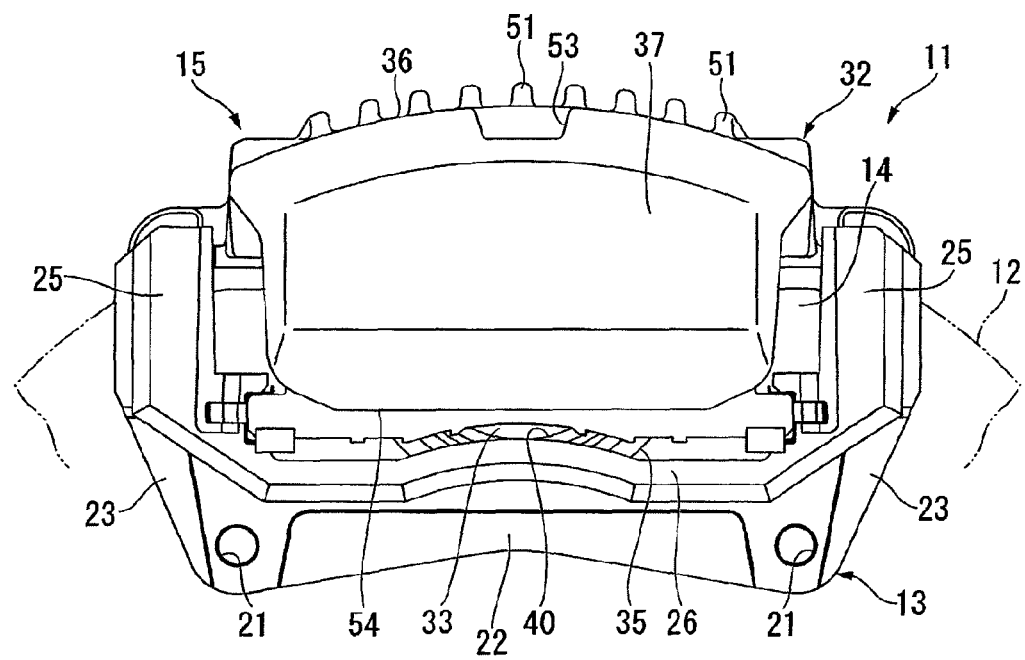
FIG. 2 is a front view illustrating the disk brake according to the first embodiment of the present invention.

As shown in FIG. 2, the carrier 13 is integrally constituted by a base plate 22, a pair of inner-side pad supports 23, a pair of coupling portions 24, a pair of outer-side pad supports 25, and a beam 26. The base plate 22 is disposed at the vehicle inner side (inner side) relative to the disk 12 while extending in the disk rotational direction, and includes vehicle attachment holes 21 at the respective sides of the disk rotational direction thereof. The pair of inner-side pad supports 23 is disposed so as to extend from the respective ends of the disk rotational direction of the base plate 22 to the outer sides of the disk radial direction. The pair of coupling portions 24, as shown in FIG. 1, is formed so as to protrude from the outer ends of the disk radial direction of the inner-side pad supports 23 to the vehicle outer side (outer side) along the disk axial direction to extend over the radially outer side of the disk 12. The pair of outer-side pad supports 25, as shown in FIG. 2, is formed so as to extend from the opposite side of the pair of coupling portions 24 from the inner-side pad supports 23 to the inner side of the disk radial direction. The beam 26 is formed to connect the inner sides of the disk radial direction of the outer-side pat supports 25. Further, as shown in FIG. 1, the pair of inner-side pad supports 23 slidably supports the inner-side brake pad 14, and the pair of outer-side pad supports 25 slidably supports the outer-side brake pad 14.

In the carrier 13, support pins 28 are respectively fitted from the vehicle inner side at the positions of the pair of coupling portions 24 disposed at the outer side of the disk radial direction at the respective ends of the disk rotational direction, so as to be slidable in the disk axial direction. The caliper 15 is attached to the carrier 13 through the support pins 28. The portions of the pair of support pins 28 between the caliper 15 and the carrier 13 are covered with a pair of extendable/contractable boots 29.

The caliper 15 comprises a caliper body 32 supported to the carrier 13 through the support pins 28 while extending over the disk 12, and a piston 33 retained by the caliper body 32 and disposed so at to face one surface side of the disk 12 as shown in FIG. 2.

As shown FIG. 1, the caliper body 32 is integrally constituted by a cylinder portion 35, a bridge portion 36, and a claw portion 37. The cylinder portion 35 is disposed so as to face the vehicle inner side which is one surface side of the disk 12. The bridge portion 36 is formed to extend from the radially outer side of the cylinder portion 35 along the axial direction of the disk 12 to extend over the disk 12. The claw portion 37 is formed to face the vehicle outer side which is the other surface side of the disk 12 by extending from the opposite side of the bridge portion 36 from the cylinder portion 35 to the inner side of the disk radial direction. That is, the caliper 15 is a fist-type caliper in which the caliper body 32 thereof is constituted by the cylinder portion 35 disposed at the one surface side of the disk 12, the claw portion 37 disposed at the other surface side of the disk 12, and the bridge portion 36 connecting the claw portion 37 and the cylinder portion 35 and extending over the disk 12.

As shown in FIG. 2, the cylinder portion 35 has a bottomed cylindrical shape including a bore 40 extending along the disk axial direction so as to open to the disk 12 side. The piston 33 is inserted in the bore 40. In the caliper 15, a fluid pressure introduced into the bore 40 causes the piston 33 to advance to the disk 12 side and push the inner-side brake pad 14 into contact with the disk 12. The reaction force generated from the push of the piston 33 causes the support pins 28 to slidably move relative to the carrier 13 in a direction moving the cylinder portion 35 away from the disk 12, and thereby causes the claw portion 37 to push the outer-side brake pad 14 into contact with the disk 12. In this way, the brake pads 14 at the respective sides are sandwiched by the piston 33 and the claw portion 37 to be pressed against the disk 12 to generate frictional resistance, thereby generating a braking force.

The caliper body 32 is made of a same casting material regardless of whether the disk brake is installed on the left side or the right side of a vehicle. That is, the casing material has a symmetrical configuration around the center of the caliper body 32 in the disk rotational direction. Therefore, a pair of bleeder bosses 44 for attachment of a bleeder plug 43 for air bleeding shown in FIG. 1 is formed at the outer side of the disk radial direction at the bottom portion 41 side of the cylinder portion 35 in a relationship spaced-apart in the disk radial direction. The caliper body 32 shown in FIG. 1, which is installed on one of the left side and the right side of a vehicle, includes a plug attachment hole 45 constituted by a threaded hole for attachment the bleeder plug 43 to only one of the pair of bleeder bosses 44, while there is no plug attachment hole 45 formed at the other bleeder boss 44. At the caliper body 32 which is installed on the different side from the side where the caliper body 32 shown in FIG. 1 is installed, i.e., the other side of the left side and the right side of a vehicle, the plug attachment hole 45 is formed only at the above-mentioned other of the pair of bleeder bosses 44.

Figure 3:
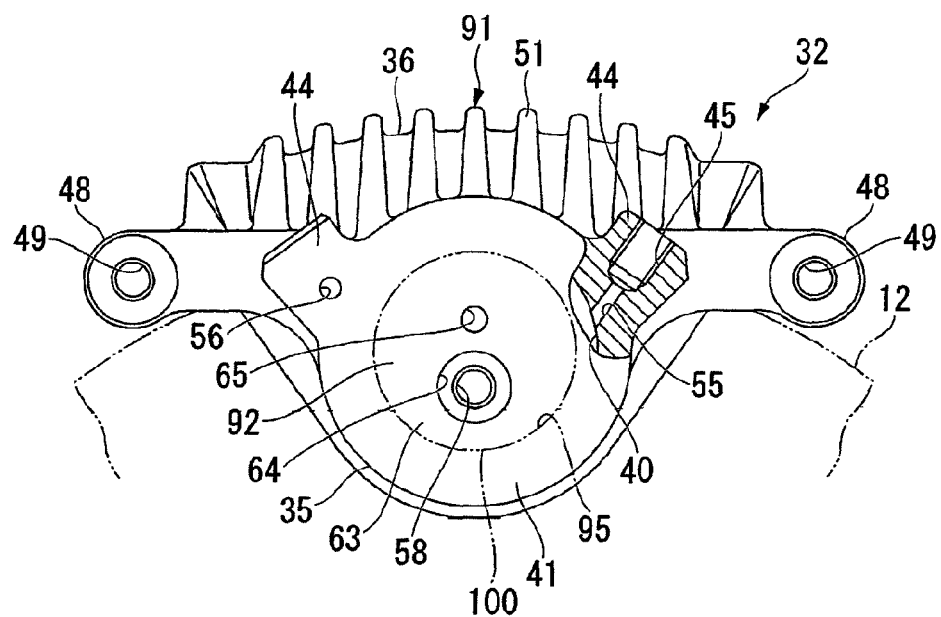
FIG. 3 is a back view illustrating a caliper body of the disk brake according to the first embodiment of the present invention.

As shown in FIG. 1, a pair of pin attachment portions 48 protruding to the respective sides of the disk rotational direction is formed at an intermediate position of the cylinder portion 35 of the caliper body 32 in the disk axial direction. Further, the pair of pin attachment portions 48, as shown in FIG. 3, is formed at the slightly outer side of the disk radial direction relative to the center of the bore 40. Pin attachment holes 49 are formed at the pin attachment portions 48 so as to extend along the disk axial direction. The above-mentioned support pins 28 shown in FIG. 1 are fixedly inserted in the pin attachment holes 49.

As shown in FIG. 1, the above-mentioned bridge portion 36 is formed at the caliper body 32 at the claw portion 37 side relative to the pin attachment portions 48 while having a plate-like shape curved along the outer circumferential surface of the disk 12 and having a substantially constant width in the disk rotational direction. A part of the bridge portion 36 at the opposite side from the claw portion 37 overlaps the cylinder portion 35 in the disk axial direction. The bridge portion 36 include a plurality of ribs 51 formed mainly at the portion overlapping the cylinder portion 35. The ribs 51 protrude to the outer side of the disk radial direction, extend along the disk axial direction, and are arranged in the disk rotational direction. Further, the bridge portion 36 includes a rectangular window 52 at the claw portion 37 side relative to the ribs 51. The window 52 penetrates in the disk axial direction, and is positioned at the center of the disk rotational direction. Further, a rectangular stepped portion 53 concaved to the inner side of the disk radial direction is formed at the end of the bridge portion 36 at the claw portion 37 side at the center of the disk rotational direction.

Figure 4:
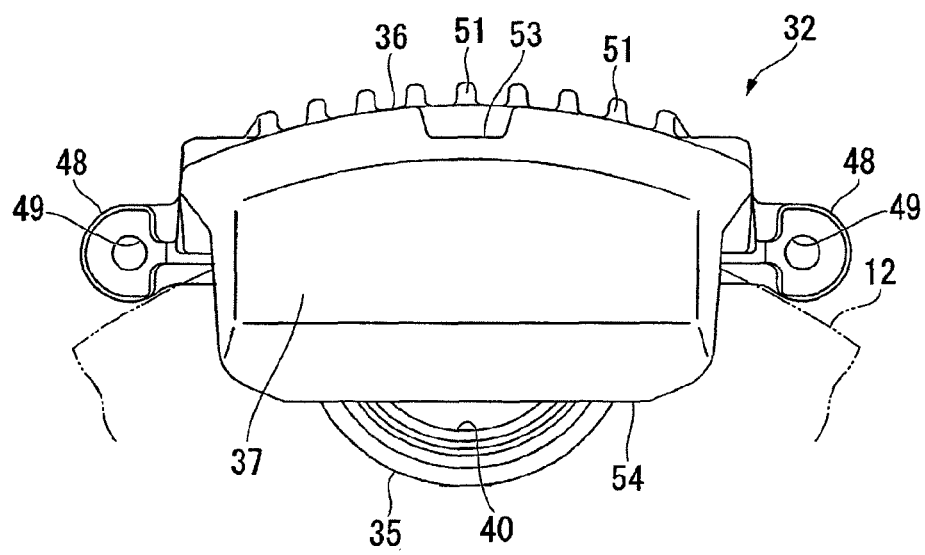
FIG. 4 is a front view illustrating the caliper body of the disk brake according to the first embodiment of the present invention.

Further, the above-mentioned claw portion 37 is formed at the caliper body 32 at the opposite side of the bridge portion 36 from the cylinder portion 35. As shown in FIG. 4, the claw portion 37 has a plate-like shape and a substantially constant width in the disk rotational direction. The claw portion 37 has an inner end edge 54 at the inner side of the disk radial direction, which forms a line perpendicular to a disk radial line of the caliper body 32 passing through the center of the disk rotational direction (in other words, forms a line in parallel with a line connecting the pin attachment holes 49 at the respective sides of the caliper body 32). The linear inner end edger 54 extends across the whole cylinder 35 at the inner side of the disk radial direction relative to the center of the bore 40, i.e., the center of the cylinder portion 35, as viewed from the front of the disk brake 11. Therefore, the portion of the claw portion 37 which faces the bore 40 of the cylinder portion 35 is formed so as to cover the center of the cylinder portion 35. The claw portion 37 does not include a recess concaved from the inner end edge 54 at the inner side of the disk radial direction to the outer side of the disk radial direction and penetrating in the disk axial direction for insertion of a tool for applying a cutting process to the bore 40 of the cylinder portion 35. Due to this configuration, the inner end edge 54 of the claw portion 37 continuously linearly extend across the whole bore 40 in the disk rotational direction.

Further, the cylinder portion 35 of the caliper body 32 shown in FIG. 1 has a substantially circular shape as a whole at the portion at the opposite side of the pint attachment portions 48 from the claw portion 37, i.e., the portion including the bottom portion 41 of the bore 40 shown in FIG. 3. The substantially circular bottom portion 41 of the bore 40 includes the above-mentioned pair of bleeder bosses 44 formed protrudingly to the outer side of the disk radial direction while being inclined so that the distance between the bleeder bosses 44 increases toward the tips thereof. The bleeder bosses 44 are protrudingly formed such that they form a same acute angle with respect to the disk radial line passing through the center of the caliper body 32 in the disk rotational direction. As mentioned above, the externally disposed plug attachment hole 45 to which the bleeder plug 43 (refer to FIG. 1) is attached, and an internally formed bleeder communication hole 55 for establishing communication between the plug attachment hole 45 and the bore 40 are formed at the center of the bleeder boss 44 at one side of the disk rotational direction according to whether the disk brake is installed on the left side or the right side of a vehicle. On the other hand, the plug attachment hole 45 and the bleeder communication hole 55 are not formed at the bleeder boss 44 at the other side of the disk rotational direction. In other words, the bleeder plug 43 is disposed at only one of the respective sides in the disk rotational direction, at the outer circumferential side of the bottom portion 41 of the bore 40 of the cylinder body 35.

At the cylinder portion 35 of the caliper body 32, a remaining hole 56, which is generated when the bottom of the bore 40 is formed by friction stir welding (FSW) as will be described later, is residually formed at the above-mentioned other bleeder boss 44 of the pair of the bleeder bosses 44 where the plug attachment hole 45 is not formed (i.e., the bleeder plug 43 is not disposed). The remaining hole 56 is concaved to an intermediate position along the disk axial direction, and is positioned at the outer side of the bore 40 in the radial direction of the bore 40.

Figure 5:
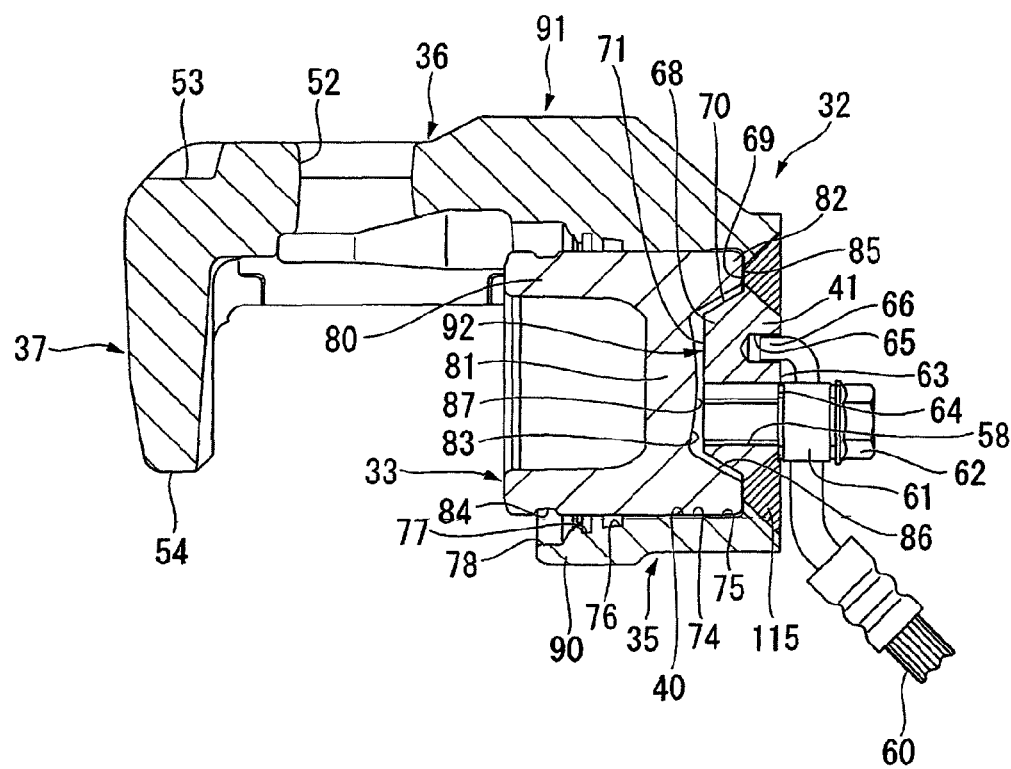
FIG. 5 across-sectional view illustrating the caliper body, a piston, a pipe and others of the disk brake according to the first embodiment of the present invention.

Further, an inflow hole 58 for use in a supply of a fluid pressure to the bore 40 is formed penetratingly along the disk axial direction at the bottom portion 41 of the bore 40 of the cylinder portion 35 at the radially inner side of the bore 40 and offset from the center of the bore 40. The inflow hole 58 is located on the disk radial line passing through the center of the caliper body 32 in the disk rotational direction, and offset from the center of the bore 40 to the inner side of the disk rotational direction (opposite side from the bridge portion 36) as a whole. The inflow hole 58 comprises a threaded hole, and as shown in FIG. 5, is configured to enable a union bolt 62 to be screwed therein. Due to the union bolt 62, a pipe 60 is fixed at a base 61 thereof to the bottom portion 41 while being in communication with the bore 40. A counterbore 64 is formed at the outer surface 63 side of the bottom portion 41 so as to be coaxial with and shallower than the inflow hole 58.

Further, as shown in FIG. 3, a rotation preventing hole 65 is formed at the bottom portion 41 of the bore 40 of the cylinder portion 35 at the radially inner side of the bore 40 and offset from the center of the bore 40, so as to penetrate from the outer side to an intermediate position of the bottom portion 41 along the disk axial direction. The rotation preventing hole 65 is located on the disk radial line passing through the center of the caliper body 32 in the disk rotational direction, and offset from the center of the bore 40 to the outer side of the disk rotational direction (the bridge portion 36 side) as a whole. As shown in FIG. 5, a bent rotation preventing hook 66 fixed to the tip of the base 61 of the pipe 60 is engaged with the rotation preventing hole 65, whereby the base 61 is prevented from being rotated with the union bolt 62 when the union bolt 62 is screwed into the inflow hole 58.

A protrusion 68 protruding in the bore 40 is formed at the bottom portion 41 of the bore 40 of the cylinder portion 35. There is a bottom surface 69 around the protrusion 68. The bottom surface 69 has a deepest depth in the bore 40, is constituted by a plane perpendicular to the center line of the bore 40, and has an annular shape coaxial with the center line of the bore 40. The protrusion 68 forms a truncated conical shape comprising a conical outer surface 70 tapering from the inner end edger of the bottom 69 coaxially with the center line of the bore 40 and protruding in the axial direction of the bore 40, and a top surface 70 formed to extend in parallel with the bottom surface 69 opposite of the conical outer surface 70 from the bottom surface 69 and constituted by a circular plane coaxial with the center line of the bore 40. The above-mentioned inflow hole 58 extends along the axial direction of the bore 40 from the outer surface 63 of the bottom portion 41 to be communicated with the top surface 71 of the protrusion 68, and is formed within the range of the protrusion 68, more specifically, with in the range of the top surface 71 of the protrusion 68. Further, the rotation preventing hole 65 also extends along the axial direction of the bore 40 from the outer surface 63 of the bottom portion 41, and is formed within the range of the protrusion 68, more specifically, within the range of the top surface 71 of the protrusion 68.

The bore 40 includes a fitting inner-diameter portion 74 having a constant diameter, and a large-diameter inner-diameter portion 75 having a larger diameter than that of the fitting inner-diameter portion 74. The piston 33 is slidably fitted in the fitting inner-diameter portion 74. The large-diameter inner-diameter portion 75 is closer to the bottom portion 41 than the fitting inner-diameter portion 74, and is positioned closest to the bottom portion 41 in the bore 40. Further, an annular seal circumferential groove 76 is formed at a middle position of the fitting inner-diameter portion 74 in the axial direction. The seal circumferential groove 76 has a larger diameter than that of the fitting inner-diameter portion 74. A not-shown piston seal is retained in the seal circumferential groove 76. Further, an annular boot circumferential groove 77 and a containing stepped portion 78 are formed at the farthest side of the fitting inner-diameter portion 74 from the bottom portion 41 in the axial direction. A not-shown boot is disposed between the piston 33 and the bore 40, and one end side of the boot is fittingly retained in the boot circumferential groove 77. The boot is contained in the containing stepped portion 78.

The piston 33 is formed into a cup-like shape including a substantially cylindrical cylinder portion 80 and a substantially disk-shaped disk portion 81 formed at a middle position of the cylinder portion 80 in the axial direction so as to close the interior of the cylinder portion 80 off-center to one side of the axial direction. The piston 33 is slidably fitted at the outer circumferential surface of the cylinder portion 80 to the fitting inner-diameter portion 74 of the bore 40. The piston 33 is coaxial with the bore 40 when it is fitted in the bore 40 in this way. As such, the piston 33 includes an outer bottom portion 82 defined by the disk portion 81 and the end of the cylinder portion 80 at the side to which the disk portion 81 is positioned off-center, and a recess 83 concaved in the axial direction is defined at the outer bottom portion 82 of the piston 33.

Further, a boot circumferential groove 84 is formed on the outer circumferential surface of the opposite side of the piston 33 from the outer bottom portion 82. The other end of the above-mentioned not-shown boot of the cylinder portion 35 is fittedly retained in the boot circumferential groove 84.

The outer bottom portion 82 of the piston 33 includes an end surface 85 constituted by a plane perpendicular to the center line of the piston 33 and having an annular shape coaxial with the center line of the piston 33. The recess 83 of the piston 33 includes a conical inner surface 86 and a spherical bottom surface 87. The conical inner surface 86 is formed into a tapered shape coaxial with the center line of the piston 33 so as to have a diameter gradually reducing from the inner end edge of the end surface 85 to the inner side of the axial direction. The spherical bottom surface 87 is positioned at the opposite side of the conical inner surface 86 from the end surface 85, and is coaxial with the center line of the piston 33 and substantially spherical such that the central side thereof is closer to the end surface 85 than the outer circumferential side thereof is to the end surface 85. The piston 33 abuts at the end surface 85 thereof against the bottom surface 69 of the bore 40 in a plane-to-plane contact manner. The recess 83 is configured to contain the above-mentioned protrusion 68 of the bottom portion 41 of the bore 40 when the piston 33 abuts at the end surface 85 thereof against the bottom surface 69 of the bore 40 in this way. When the recess 83 contains the protrusion 68, a space is formed across the whole area between the conical outer surface 70 of the protrusion 68 and the conical inner surface 86 of the recess 83, and a space is also formed across the whole area between the top surface 71 of the protrusion 68 and the spherical bottom surface 87 of the recess 83.

Figure 6:
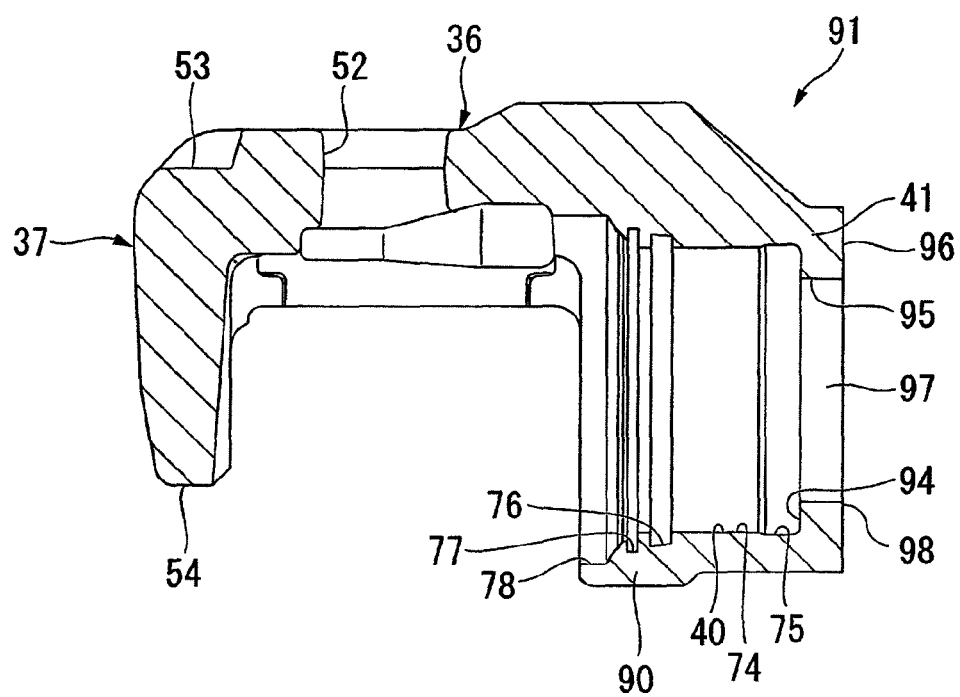
FIG. 6 is a cross-sectional view illustrating a caliper body main part of the disk brake according to the first embodiment of the present invention.
Figure 7:
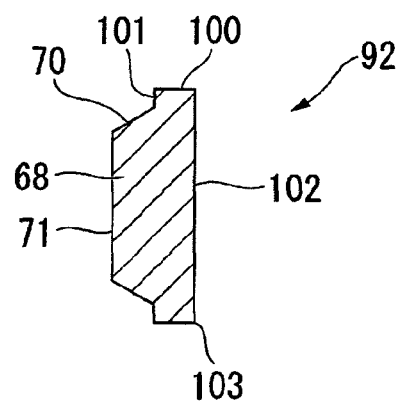
FIG. 7 is a cross-sectional view illustrating a bottom cover member of the disk brake according to the first embodiment of the present invention.

In the first embodiment, the caliper body 32 is formed by welding a bottom cover member 92 shown in FIG. 7 to a caliper body main part 91 shown in FIG. 6 by friction stir welding. As shown in FIG. 6, the caliper body main part 91 is constituted by the claw portion 37, the bridge portion 36, and a cylinder constituting portion 90 that is constituted by the cylinder portion 35 from which a part of the bottom portion 41 is removed. As shown in FIG. 7, the bottom cover member 92 constitutes the bottom portion 41 of the cylinder portion 35. The caliper body main part 91 and the bottom cover member 92 are respectively separately formed into an integrally constituted body from aluminum alloy by casting. This means that the caliper body 32 prepared by welding them is also made of aluminum alloy. The above-mentioned pair of bleeder bosses 44 shown in FIG. 3 is also formed at the caliper body main part 91 when the caliper body main part 91 is formed into an integrally constituted body by casting.

The caliper body main part 91 shown in FIG. 6 includes an annular bottom surface constituting surface 94 having a certain width coaxial with the bore 40. The bottom surface constituting surface 94 is constituted by a plane perpendicular to the center line of the bore 40, which corresponds to a part of the bottom surface 69 of the bore 40 of the cylinder portion 35 at the radially outer side thereof shown in FIG. 5. Further, the caliper body main part 91 includes a fitting cylindrical surface 95 extending from the inner circumferential edge of the bottom surface constituting surface 94 to the outer side along the axial direction of the bore 40, defining a cylindrical shape having a certain diameter coaxial with the bore 40. Further, the caliper body main part 91 includes an outer surface constituting surface 96 extending radially outwardly from the outer circumferential edge of the fitting cylindrical surface 95 at the opposite side from the bottom surface constituting surface 94. The outer surface constituting surface 96 corresponds to a part of the outer side of the outer surface 63 shown in FIG. 5, and is constituted by a plane perpendicular to the center line of the bore 40. Therefore, the inner side of the fitting cylindrical surface 95 defines an opening 97 penetrating through the bottom portion 41 of the bore 40. The portion surrounding the opening 97, which includes the fitting cylindrical surface 95, defines an opening surrounding portion 98. As a result, the cylinder constituting portion 90 of the cylinder 35, which is formed at the caliper body main part 91, have a bottomless tubular shape having open ends at the respective sides, not a bottomed cylindrical shape. The casting material of the caliper body main part 91 is configured such that the front and back thereof are symmetrical around the center of the disk rotational direction.

Figure 8:
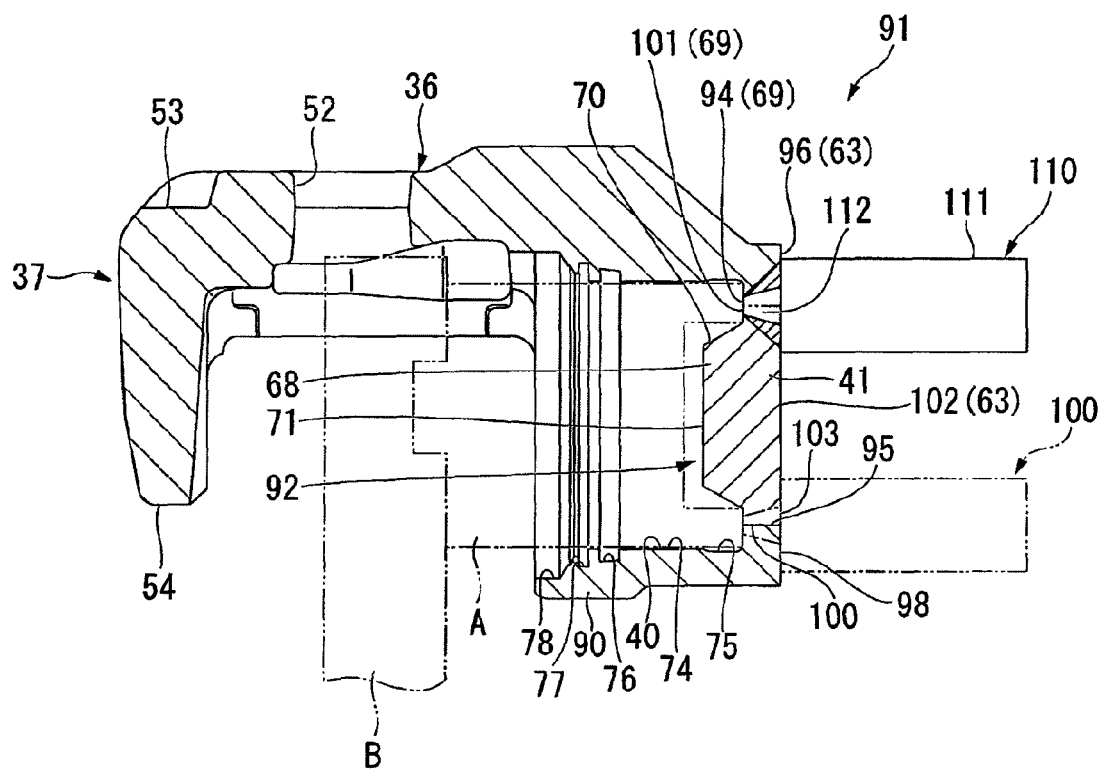
FIG. 8 is a cross-sectional view illustrating friction stir welding of the caliper body of the disk brake according to the first embodiment of the present invention.
Figure 9:
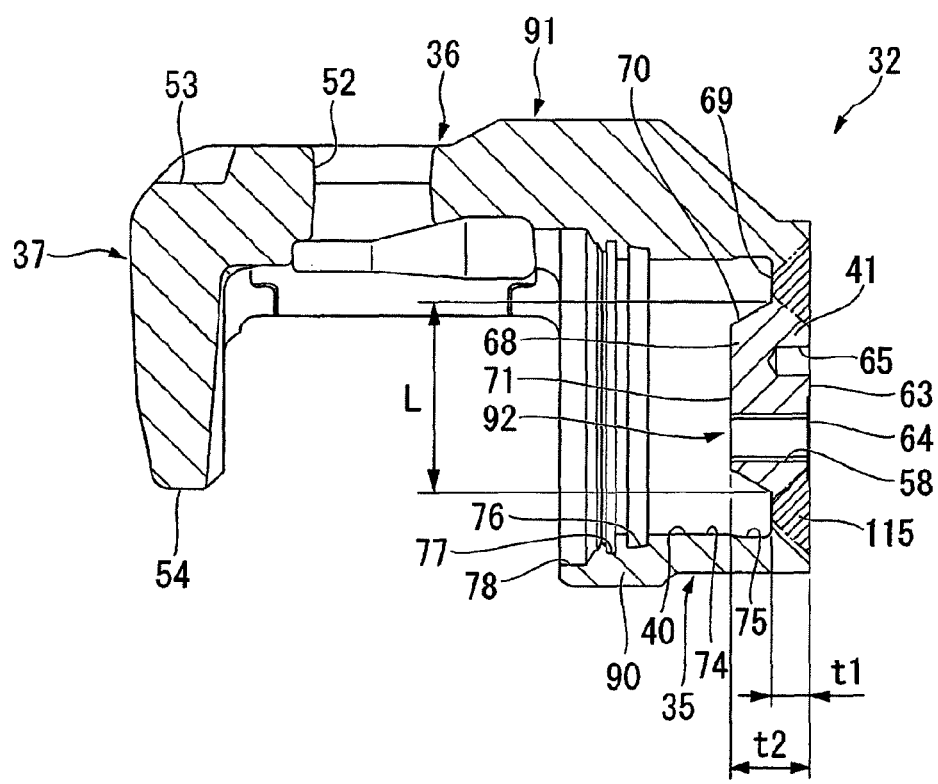
FIG. 9 is a cross-sectional view illustrating the caliper of the disk brake according to the first embodiment of the present invention.

The bottom cover member 92 shown in FIG. 7 is formed into a disk shape, and is fitted in the fitting cylindrical surface 95 of the cylinder constituting portion 90 of the caliper body main part 91 as shown in FIG. 8. That is, as shown in FIG. 9, the bottom cover member 92 includes a fitting cylindrical surface 100, a bottom surface constituting surface 101, the above-mentioned conical outer surface 70, and the above-mentioned top surface 71. The fitting cylindrical surface 100 constitutes a maximum-diameter portion and has a cylindrical shape with a certain diameter. The bottom surface constituting surface 101 is formed to extend from one end edge of the fitting cylindrical surface 100 in the axial direction to the inner side perpendicularly to the axial direction. The bottom surface constituting surface 101 has a certain width, and is constituted by an annular plane corresponding to a part of the bottom surface 69 of the bore 40 at the radially inner side thereof shown in FIG. 5. The conical outer surface 70 protrudes from the inner circumferential edge of the bottom surface constituting surface 101 in a manner tapering to one side of the axial direction coaxially with the fitting cylindrical surface 100. The top surface 71 is disposed at the opposite side of the conical outer surface 70 from the bottom surface constituting surface 101 in parallel with the bottom surface constituting surface 101. Further, the bottom cover member 92 includes an outer surface constituting surface 102. The outer surface constituting surface 102 is constituted by a circular plane extending from the other end edge of the fitting cylindrical surface 100 in the axial direction to the inner side perpendicularly to the axial direction. The outer surface constituting surface 102 corresponds to a part of the outer side of the outer surface 63 shown in FIG. 5. Therefore, while one surface of the bottom cover member 92 has the protrusion 68 having the conical outer surface 70 and the top surface 71, the other surface of the bottom cover member 92 has the outer surface constituting surface 102 which is a flat surface extending perpendicularly to the axial direction. As such, the bottom cover member 92 has a same shape in any cross section including the center axis. In other words, the bottom cover member 92 has a shape formed by rotating the cross section thereof around the center axis. Therefore, the casting material of the bottom cover member 92 is also configured such that it is symmetrical around the center of the disk rotational direction.

The caliper body 32 is formed in the following manner. The casting material for preparing the caliper body main part 91 shown in FIG. 6 is integrally made from aluminum alloy. At the casting stage, the claw portion 37, the bridge portion 36, and the bottomless tubular cylinder constituting portion 90 having a pilot hole inside are formed at the casting material of the caliper body main part 91. The inside of the pilot hole in the cylinder constituting portion 90 is processed by cutting with use of a cutting tool inserted from the opposite side from the claw portion 37 through the pilot hole portion of the fitting cylindrical surface 95, thereby forming the fitting inner-diameter portion 74, the seal circumferential groove 76, the boot circumferential groove 77, the containing stepped portion 78 and the fitting circumferential surface 95 inside the bore 40. As a result, the cylinder constituting portion 90 having a tubular shape with openings at the both ends is formed at the caliper body main part 91, as shown in FIG. 6. The large-diameter inner-diameter portion 75, the bottom surface constituting surface 94, and the outer surface constituting surface 96 are formed at the time of casting, although they may be formed by cutting. This process results in preparation of the caliper body main part 91 formed by cutting the integrally constituted casting material of aluminum alloy, which includes the cylinder constituting portion 90, the bridge portion 36 extending from the radially outer side of the cylinder constituting portion 90 in the axial direction so as to straddle the disk 12, and the claw portion 37 at the opposite side of the bridge portion 36 from the cylinder constituting portion 90 (caliper body main part preparation process).

Further, the bottom cover member 92 is prepared from an integrally-constituted disk-like material of aluminum alloy by applying a cutting processing to the fitting cylindrical surface 100, thereby forming a disk-like shape with the protrusion 68 on one surface side as shown in FIG. 7 (bottom cover member preparation process). The bottom surface constituting surface 101, the conical outer surface 70, the top surface 71, and the outer surface constituting surface 102 are formed at the time of casting, although they may be formed by cutting.

Then, core tools A and B are inserted in the bore 40 of the caliper body main part 91 shown in FIG. 8 prepared in the above-mentioned caliper body main part preparation process, and then are integrally held. While being in this state, the caliper body main part 91 is placed with the claw portion 37 down and is set at a friction stir welding apparatus. Then, the bottom cover member 92 prepared in the above-mentioned bottom cover member preparation process is placed with the protrusion 68 down, and the fitting cylindrical surface 100 thereof is fitted in the fitting cylindrical surface 95 of the cylinder constituting portion 90 of the caliper body main par 91. As a result, the bottom cover member 92 enters such a state that the protrusion 68 protrudes at one surface side facing the interior of the bore 40. At this time, the bottom surface constituting surface 94 of the caliper body main part 91 and the bottom surface constituting surface 101 of the bottom cover member 92 abut against the not-shown same reference surface of the core tool, and the bottom cover member 92 is positionally fixed relative to the caliper body 91 with the aid of engagement of the fitting cylindrical portions 95 and 100.

In this state, an outer circumferential edge 103 including the fitting cylindrical surface 100 of the bottom cover member 92 with the protrusion 68 placed inside the cylinder constituting portion 90 is integrally welded to the opening surrounding portion 98 including the fitting cylindrical surface 95 which constitutes the bottom portion 41 side of the cylinder constituting portion 90 by friction stir welding, thereby forming the bottom portion 41 of the bore 40 (friction stir welding process).

A welding tool 110 used in this friction stir welding process includes a cylindrical large-diameter shaft portion 111, and a tip shaft portion 112 which has a smaller diameter than the diameter of the large-diameter shaft portion 111 and is coaxial with the large-diameter shaft portion 101. The tip shaft portion 112 having a tapered truncated conical shape is rapidly rotated, whereby the opening surrounding portion 98 of the cylinder constituting portion 90 and the outer circumferential edge 103 of the bottom cover member 92 are frictionally melted, stirred, and then welded to each other.

In the above-mentioned friction stir welding process, the tip shaft portion 112 of the rapidly rotating welding tool 110 is continuously moved in a predetermined direction along the connection boundary between the opening surrounding portion 98 of the cylinder constituting portion 90 and the outer circumferential edge 103 of the bottom cover member 92, starting from the position near the one of the pair of bleeder bosses 44, the bleeder boss being shown on the right side of FIG. 3, where the plug attachment hole 45 will not be formed, thereby circularly performing friction stir welding throughout the whole circumference of the opening surrounding portion 98 and the outer circumferential edge 103, so that the bottom cover member 92 can be integrally welded to the caliper body main portion 91 at the boundary therebetween. That is, the welding tool 100 is moved so as to form a loop-like welding track of friction stir welding along the connection boundary between the bottom cover member 92 and the caliper body main part 91.

Then, after the welding tool 110 is returned to the position of the bleeder boss 44 where the plug attachment hole 45 will not be formed near the welding start point, the welding tool 110 is moved to the bleeder boss 44 side. After that, the welding tool 110 is pulled out from the caliper body 32. This process results in a formation of the remaining hole 56 by the tip shaft portion 112 of the welding tool 100 at the position of the bleeder boss 44 where the plug attachment hole 45 will not be formed, at the outer side relative to the bore 40, as shown in FIG. 3.

The opening surrounding portion 98 of the cylinder constituting portion 90 and the outer circumferential edge 103 of the bottom cover member 92 shown in FIG. 8 are welded to each other by friction stir welding while being positionally fixed by the core tools A and B. The bottom surface 69 shown in FIG. 9 is formed by the bottom surface constituting surface 94 and the bottom surface constituting surface 101, and the outer surface 63 shown in FIG. 9 is formed by the outer surface constituting surface 96 and the outer surface constituting surface 102 shown in FIG. 8. A welded portion 115 which is solidified after being melted by friction stir welding and then integrated has a substantially annular shape extending around the center axis of the bore 40. The cross-sectional shape of the welded portion 15 which includes the center axis of the bore 40 has a width tapering off toward the bore 40 side.

The protrusion 68 protruding to the inner side of the bore 40 relative to the bottom surface 69 of the bore 40 is formed at the caliper body 32 constituted by the caliper body main part 91 and the bottom cover member 92 welded to each other by the above-mentioned friction stir welding process. In other words, the thickness t2 from the outer surface 63 to the top surface 71 which is the end surface of the protrusion 68 at the inner side of the bore 40 is greater than the thickness t1 from the outer surface 63 to the bottom surface 69 as shown in FIG. 9.

As shown in FIG. 9, the above-mentioned inflow hole 58 for use in a supply of a fluid pressure to the bore 40, the counterbore 64 and the rotation preventing hole 65 are penetratingly formed from the outside at the bottom portion 41 of the cylinder portion 35 constituted by the bottom cover member 92, at the caliper body 32 constituted by the caliper body main part 91 and the bottom cover member 92 welded together by the above-mentioned friction stir welding process (inflow hole and others forming process). That is, as shown in FIG. 3, the inflow hole 58 formed to include a threaded hole so as to establish communication between the top surface 71 corresponding to one surface with the protrusion 68 formed thereon and the outer surface 63 corresponding to the other surface is formed by cutting within the range of the protrusion 68 as shown in FIG. 9 at a position offset from the center of the bore 40 to the inner side of the disk radial direction on the disk radial line passing through the center of the disk rotational direction of the caliper body 32. Further, the counterbore 64 is formed by cutting so as to be coaxial with the inflow hole 58. Further, as shown in FIG. 3, the rotation preventing hole 65 is penetratingly formed so as to extend to an intermediate position as shown in FIG. 9, at a position on the disk radial line passing through the center of the disk rotational direction of the caliper body 32 and offset from the center of the bore 40 to the outer side of the disk radial direction. Further, as shown in FIG. 3, the plug attachment hole 45 and the bleeder communication hole 55 are penetratingly formed along the protruding direction at the one of the pair of bleeder bosses 44 where the bleeder plug 43 (refer to FIG. 1) will be attached which is determined according to whether the disk brake will be installed on the left side or right side of a vehicle, so that the bore 40 is in communication with the radially outer side. The plug attachment hole 45 and the bleeder communication hole 55 may be formed in the above-mentioned caliper body main part preparation process before the friction stir welding process. If the plug attachment hole 45 and the bleeder communication hole 55 are formed in the caliper body main part preparation process, the process of cleaning up dust generated at the time of the cutting after the friction stir welding process becomes unnecessary, and thereby the manufacturing efficiency can be improved.

Figure 10:
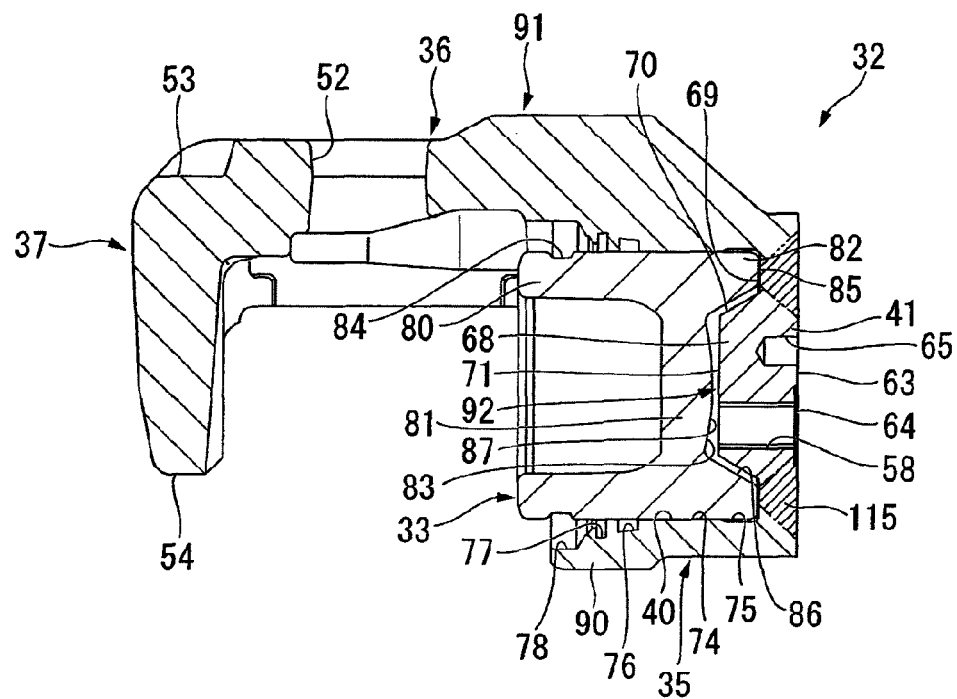
FIG. 10 is a cross-sectional view illustrating the caliper body and the piston of the disk brake according to the first embodiment of the present invention.

At the caliper body 32 shown in FIG. 10 formed as mentioned above, the not-shown piston seal is fitted in the seal circumferential groove 76, one end of the boot is fitted in the boot circumferential groove 77, the piston 33 is fitted in the bore 40, and the other end of the boot is fitted in the boot circumferential groove 84 from the space between the claw portion 37 and the cylinder portion 35. Further, the bleeder plug 43 shown in FIG. 1 is attached to the plug attachment hole 45. The caliper 15 is assembled in this way.

Then, as shown in FIG. 5, the pipe 60 is attached to the caliper 15 assembled in the above-mentioned manner. More specifically, while the bent rotation preventing hook 66 fixed to the base 61 of the pipe 60 is engaged with the rotation preventing hole 65, the union bolt 62 is inserted through the base 61 and is screwed in the inflow hole 58. Then, while the base 61 of the pipe 60 is prevented from rotating due to the rotation preventing hook 66 and the rotation preventing hole 65, the base 61 of the pipe 60 is fixed to the caliper 15 along with the union bolt 62, whereby communication is established between the interior of the bore 40 and the pipe 60. At this time, the base 61 abuts against the counterbore 64, and thereby is maintained in a perpendicularly arranged state to the inflow hole 58.

Then, the caliper 15 is mounted onto a vehicle, and brake fluid is supplied into the bore 40 of the caliper body 32 by vacuuming. At this time, the piston 33 is pulled to the inner side of the bore 40 due to the negative pressure of the vacuuming, whereby the end surface 85 of the piston 33 abuts against the bottom surface 69 of the bore 40. However, even in this state, the piston 33 is prevented from adhering to the bottom portion 41 of the bore 40 since there is a space between the protrusion 68 and the recess 83 of the piston 33 which contains the protrusion 68 at the bottom 41 of the bore 40.

In the disk brake disclosed in the above-mentioned patent document Japanese Patent Public Disclosure No. 2007-10136, the cylinder portion defining the bore is formed into a tubular shape, and the bottom of the bore is formed by integrally welding the opening surrounding portion at the bottom side of the cylinder portion and the bottom cover member fitted in the opening surrounding portion by friction stir welding. This disk brake is mainly for use in a two-wheeled vehicle, and therefore the inflow hole for use in a supply of a fluid pressure into the bore is provided at the outer side of the disk radial direction of the caliper. On the other hand, generally, at a disk brake for use in a four-wheeled vehicle, the inflow hole is formed at the bottom of the bore. If the inflow hole is formed at the bottom of the bore in this way, a boss portion (protrusion) required for forming the inflow hole is formed at the outer surface of the bottom. Therefore, there is a possibility that this boss portion may contact or interfere with the welding tool of friction stir welding, thereby making friction stir welding difficult and reducing the manufacturing efficiency.

On the other hand, according to the disk brake 11 of the first embodiment, the bottom cover member 92 is formed into a disk shape, and the protrusion 68 is formed on one surface side facing the interior of the bore 40. The inflow hole 58 for use in a supply of a fluid pressure into the bore 40 is formed within the range of the protrusion 68 to establish communication between the top surface 71 on the one surface side and the outer surface 63 on the other surface side. As a result, the protrusion 68 required for forming the inflow hole 58 is formed inside the bore 40, thereby making the friction stir welding performed at the outside of the bore 40 with use of the welding tool 110 easy, and improving the efficiency of manufacturing of the caliper 15.

Further, the inflow hole 58 can be formed within the range of the protrusion 68 disposed in the bore 40, thereby improving flexibility about the arrangement including the position of the inflow hole 58, i.e. the position of the pipe 60

The caliper body 32 of the fist-type (floating type) caliper 15, which comprises the bridge portion 36 connecting the claw portion 37 and the cylinder portion 35 to extend over the disk 12, is configured such that the portion of the claw portion 37 which faces the bore 40 of the cylinder portion 35 covers the center of the cylinder portion 35, whereby it is possible to improve the strength and the rigidity of the claw portion 37. As a result, it is possible to prevent an occurrence of brake noises due to a lack of sufficient strength of the claw portion 37, and therefore improve reliability of the disk brake.

Further, since the cutting processing in the bore 40 can be carried out from the bottom portion 41 side of the cylinder portion 35 instead of carrying out the cutting processing in the bore 40 from the claw portion 37 side, it is possible to reduce the overhang from the fixed portion of the cutting tool to the tip of the cutting tool, thereby reducing the cutting time while maintaining the cutting accuracy.

Further, since the same casting material is used for the disk brake regardless of whether the disk brake is installed on the left side or the right side of a vehicle, the pair of bleeder bosses 44 is formed at the cylinder portion 35 in a outwardly protruding manner. However, the finish position of the friction stir welding for the formation of the bottom portion 41 is set to the one of the pair of the bleeder bosses 44 which the bleeder plug 43 is not attached to, whereby the remaining hole 56 can be spaced-apart from the bore 40, the bleeder communication hole 55 in communication with the bore 40, and the plug attachment hole 45. Therefore, it is possible to prevent a thin portion from being generated due to the remaining hole 56, at an portion of the bottom portion 41 overlapping over the bore 40, i.e., at a portion of the bottom portion 41 at the radially inner side of the bore 40. Further, a special portion for the finish position of the friction stir welding does not have to be provided at the caliper 15, whereby it is possible to reduce the weight of the caliper 15, and therefore the weight of the disk brake.

Further, since the bottom cover member 92 has the flat outer surface constituting surface 102 which is the other surface constituting the outer surface 63, it is possible to make the friction stir welding performed from the outside of the bore 40 with use of the welding tool 110 further easier, thereby further improving the efficiency of manufacturing the caliper 15. Further, because of the generally flat shape of the outer surface 63, it is possible to make the friction stir welding further easier, thereby improving the efficiency of manufacturing the caliper 15.

Further, because the caliper body 32 is made from aluminum alloy, it is possible to make the friction stir welding further easier, thereby improving efficiency of manufacturing the caliper 15, as well as reducing the weight of the caliper 15.

Further, the piston 33 is formed into a cupped shape and includes the recess 83 configured to contain the protrusion 68 at the outer bottom portion 82. Therefore, even with the protrusion 68 at the bottom portion 41 of the bore 40, it is possible to prevent an increase in the axial length of the cylinder portion 35 and therefore prevent an increase in the axial length of the caliper 15, resulting in a reduction in the size of the disk brake.

Further, since the inflow hole 58 of the bottom cover member 92 is positioned offset from the center of the bottom cover member 92, the rotation preventing hole 65 can be positioned near the center of the bottom cover member 92, and thereby the protrusion 68 (L dimension shown in FIG. 9) where the inflow hole 58 and the rotation preventing hole 65 are formed to have a reduced diameter. Therefore, it is possible to enlarge the bottom surface constituting surface 101 to be supported by the core tool at the time of the friction stir welding, thereby ensuring the support stiffness and providing the stabilized quality of friction stir welding. Since the outer diameter of the casting of the cylinder portion 35 does not have to be increased, it is possible to prevent an increase in the weight thereof, thereby reducing the weight of the disk brake.

The method of making the disk brake 11 according to the first embodiment comprises: the process of preparing the caliper body main part 91 which includes the cylinder portion 35 having the bore 40 inside of which is processed by cutting, and formed into a tubular shape with the respective ends opened, and the bridge portion 36 extending from the radially outer side of the cylinder portion 35 in the axial direction thereof so as to straddle the disk 12; the process of preparing the bottom cover member 92 formed into a disk shape and provided with the protrusion 68 on one surface side thereof; the process of integrally welding the bottom cover member 92 to the opening surrounding portion 98 at the bottom portion 41 side of the cylinder portion 35 with the protrusion 68 placed inside the cylinder 35 by friction stir welding; and the process of forming the inflow hole 58 by cutting for establishing communication between the top surface 71 at one surface side and the outer surface 63 at the other surface side within the range of the protrusion 68 at the bottom cover member 92 welded to the caliper body main part 91. In this way, the protrusion 68 required for forming the inflow hole 58 is disposed inside the bore 40, thereby making the friction stir welding performed from the outside of the bore 40 with use of the welding tool 110 easy, improving the efficiency of manufacturing the caliper 15.

Further, the process of forming the inflow hole 68 by cutting for establishing communication between the top surface 71 at one surface side and the outer surface 63 at the other surface side within the range of the protrusion 68 is carried out after the process of integrally welding the bottom cover member 92 to the cylinder portion 35 by friction stir welding. Therefore, positioning of the bottom cover member 92 in the rotational direction relative to the cylinder 35 at the time of friction stir welding is not necessary, thereby making the friction stir welding further easier and improving the efficiency of manufacturing the caliper 15.

Further, the counterbore 64 constituting the seat surface of the base 61 of the pipe 60 is formed after the process of integrally welding the bottom cover member 92 to the cylinder portion 35 by friction stir welding, thereby preventing damages and indentations from being generated at the counterbore 64. That is, although damages and indentations are easily generated, for example, when the bottom cover member 92 is set to the caliper body main part 91, the friction stir welding is carried out, and the caliper body 32 is removed from the friction stir welding apparatus after the welding, according to the present invention, this generation can be prevented.

Second Embodiment

Next, a second embodiment of the present invention will be described with main reference to FIG. 11, focusing a difference from the first embodiment.

Figure 11:
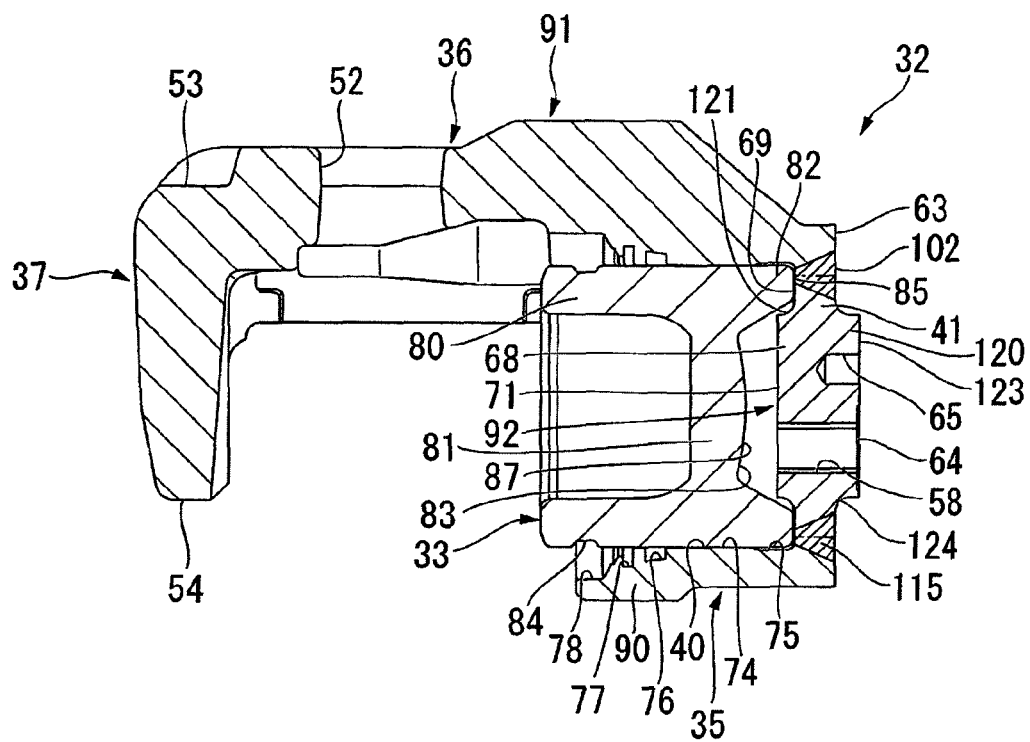
FIG. 11 is a cross-sectional view illustrating a caliper and a piston of a disk brake according to a second embodiment of the present invention.

FIG. 11 is a cross-sectional view illustrating a caliper body and a piston of a disk brake according to the second embodiment of the present invention. Like elements are identified by the same names and reference numerals as those used in the first embodiment.

In the second embodiment, the shape of the bottom cover member 92 is different from that in the first embodiment. In the second embodiment, a protrusion 120 protruding to the outside of the bore is formed at the bottom cover member 92, in addition to the protrusion 68 protruding to the interior of the bore 40. Accordingly, the protruding height of the protrusion 68 is reduced by an amount corresponding to the protrusion 120. As a result, the protrusions 68 and 120 are formed at the bottom portion 41 of the bore 40 of the cylinder portion 35 at the respective sides of the disk axial direction.

The protrusion 68 has a curved surface 121 between the top surface 71 and the bottom surface 69 instead of the conical outer surface. The curved surface 121 is curved to define a circular arc in cross-section in such a manner that the diameter of the protrusion 68 tapers toward the top surface 71 side.

The protrusion 120 has a flat top surface 123 perpendicular to the axial direction of the bore 40, and a curved surface 124 curved to define a circular arc in cross-section in such a manner that the diameter of the protrusion 120 tapers toward the top surface 123 side. The surrounding area of the curved surface 124 of the bottom cover member 92 corresponds to the flat annular outer surface constituting surface 102 extending in parallel to the top surface 123.

The protrusion 68 and the protrusion 120 are coaxial with each other and have a same diameter. The inflow hole 58, the counterbore 64, and the rotation preventing hole 65 similar to the first embodiment are formed within the range of these protrusions.

The protrusion 120 is formed into a shape enabling prevention of a contact with the welding tool 110 for friction stir welding, that is, the protrusion 120 is formed so that the distance between the protrusion 120 and the outer periphery of the bottom cover member is longer than the radius of the welded portion.

According to the above-mentioned second embodiment, since the protrusion 120 protruding to the outside of the bore 40 is provided at the bottom portion 41 of the bore 40 in addition to the protrusion 68 protruding to the interior of the bore 40, the protruding height of the protrusion 68 protruding to the interior of the bore 40 can be reduced. As a result, more brake fluid can be supplied into the bore 40 by an amount corresponding to the reduction in the height of the protrusion 68, whereby it is possible to reduce an increase in the temperature of the brake fluid at the time of braking.

If the protrusions 68 and 120 are configured to have a same protruding height, the bottom cover member 92 has a shape such that the front sided and the back side thereof are symmetrical. In this case, it is unnecessary to check which is the front side or back side when the bottom cover member 92 is welded to the caliper body main par 91 by friction stir welding. As a result, it is possible to further improve the efficiency of manufacturing the caliper 15.

Third Embodiment

Figure 12:
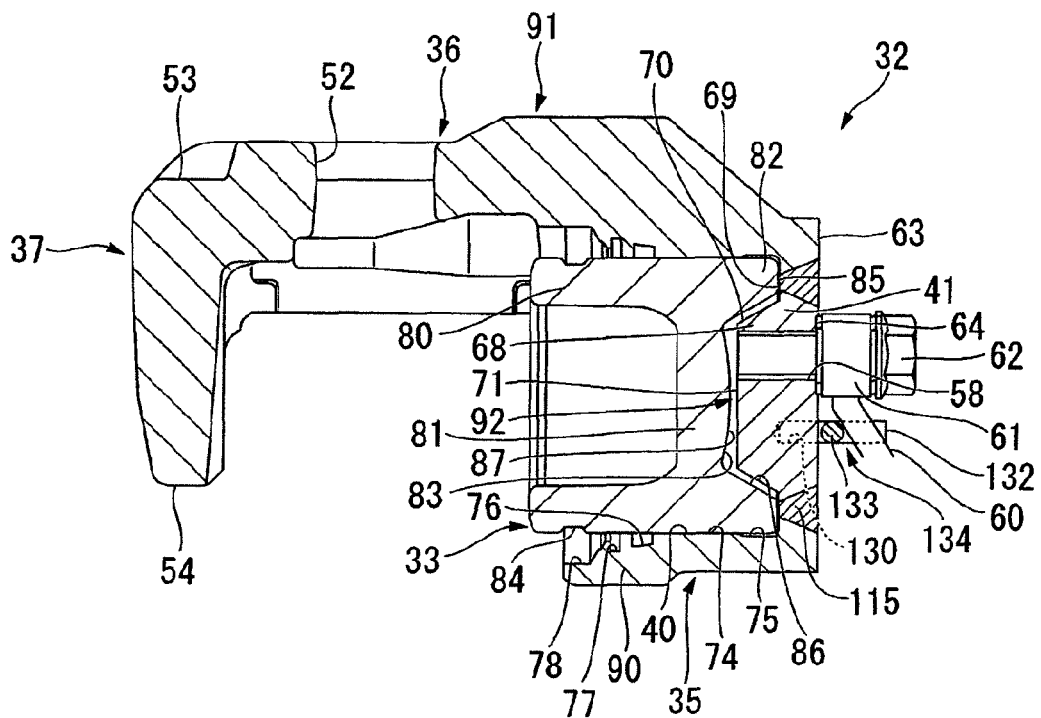
FIG. 12 is a cross-sectional view illustrating a caliper body, a piston, a pipe and others of a disk brake according to a third embodiment of the present invention.
Figure 13:
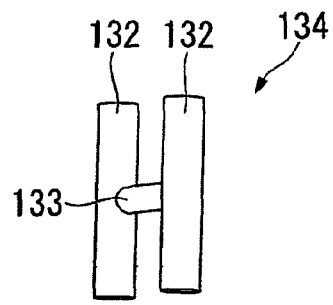
FIG. 13 is a perspective view illustrating a rotation preventing pin of the disk brake according to the third embodiment of the present invention.
Figure 14:
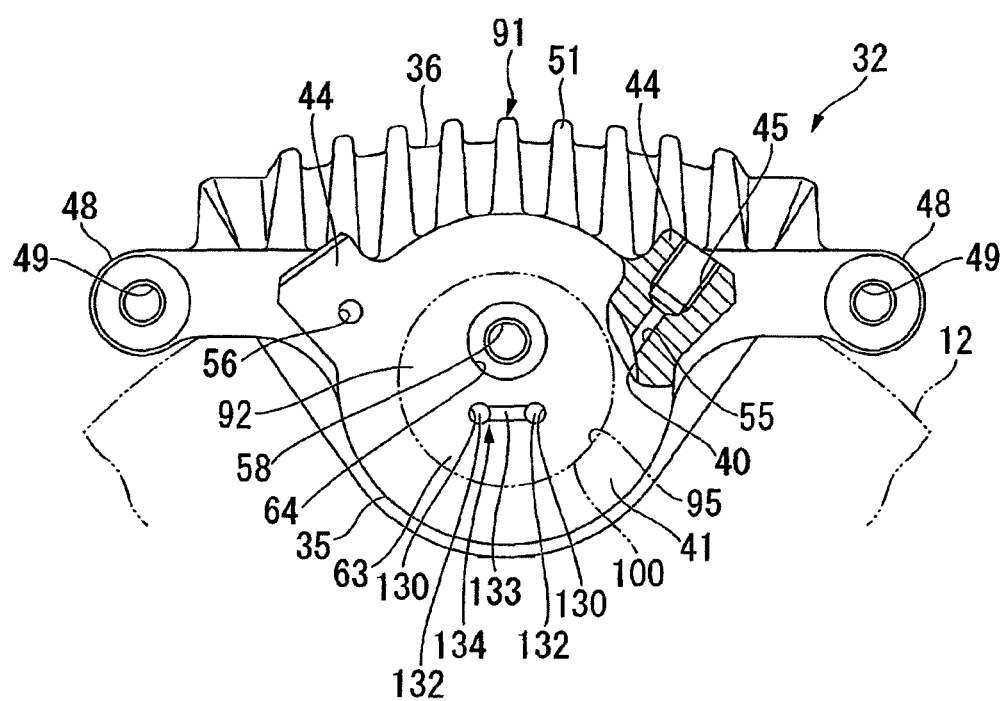
FIG. 14 is a back view illustrating the caliper body of the disk brake according to the third embodiment of the present invention.

Next, a third embodiment of the present invention will be described with main reference to FIGS. 12 to 14, focusing a difference from the first embodiment. Like elements are identified by the same names and reference numerals as those used in the first embodiment.

The third embodiment does not have the rotation preventing hook 66 and the rotation preventing hole 65 of the pipe 60 in the first embodiment. On the other hand, the third embodiment has the inflow hole 58 and the counterbore 64 similar to those in the first embodiment, which are penetratingly formed along the disk axial direction at the bottom portion 41 of the bore 40 of the cylinder portion 35 at the radially inner side of the bore 40 and offset from the center of the bore 40. In the third embodiment, as shown in FIG. 14, the inflow hole 58 is positioned on the disk radial line passing through the center of the disk rotational direction of the caliper body 32 and offset from the center of the bore 40 to the outer side of the disk radial direction (to the bridge portion 36 side) as a whole.

Further, a pair of rotation preventing pin attachment holes 130 is formed at the bottom portion 41 of the bore 40 of the cylinder portion 35 at a position at the radially inner side of the bore 40 and offset from the center of the bore 40. The pair of rotation preventing pin attachment holes 130 extends along the disk axial direction from the outside to an intermediate position. The pair of rotation preventing pin attachment holes 130 is arranged such that the center of the line connecting the holes 130 is positioned on the disk radial line passing through the center of the disk rotational direction of the caliper body 32, and offset from the center of the bore 40 to the inner side of the disk radial direction as a whole. Referring to FIG. 13, a rotation preventing pin 134 comprises a pair of parallel pin portions 132 and a connection portion 133 connecting the pair of pin portions 132, defining an H shape. The rotation preventing pin 134 is press-fitted in the pair of preventing pin attachment holes 130 at one side of the pair of pin portions 132 sectioned by the connection portion 133. As a result, the rotation preventing pin 134 is disposed such that the other side of the pair of pin portions 132 sectioned by the connection portion 133 protrudes from the bottom portion 41 to the outside along the axial direction of the bore 40 while the pin portions 132 are arranged in the disk rotational direction. Insertion of the pipe 60 between the pin portions 132 at the other side prevents the base 61 from being rotated with the union bolt 62 when the union bolt 62 is screwed into the inflow hole 58.

The inflow hole 58 in the third embodiment is also formed to establish communication between the outer surface 63 of the bottom portion 41 and the top surface 71 of the protrusion 68, and positioned within the range of the protrusion 68. Further, the pair of rotation preventing pin attachment holes 130 is also formed within the range of the protrusion 68.

Fourth Embodiment

Next, a fourth embodiment of the present invention will be described with main reference to FIG. 15, focusing a difference from the first embodiment.

Figure 15:
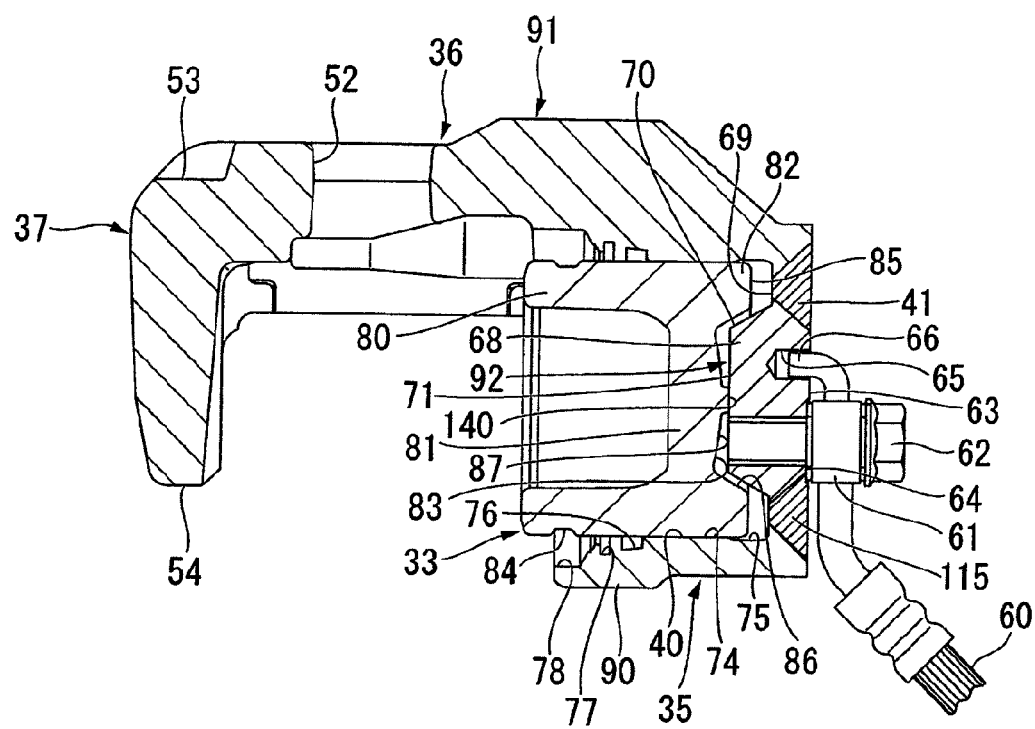
FIG. 15 is a cross-sectional view illustrating a caliper body, a piston, a pipe and others of a disk brake according to a fourth embodiment of the present invention.

FIG. 15 is a cross-sectional view illustrating a caliper body, a piston, a pipe and others of the disk brake according to the fourth embodiment of the present invention. Like elements are identified by the same names and reference numerals as those used in the first embodiment.

In the fourth embodiment, an abutment protrusion 140 is formed at the center of the spherical bottom surface 87 of the piston 33 so as to protrude along the axial direction of the piston 33. The piston 33 abuts at the abutment protrusion 140 against the bottom portion 41 of the bore 40 of the cylinder portion 35. More specifically, the piston 33 abuts against such a position of the top surface 71 of the protrusion 68 of the bottom portion 41 that the abutment protrusion 140 does not overlap the inflow hole 58.

The recess 83 of the piston is configured to contain the protrusion 68 of the bottom portion 41 with the piston 33 abutting at the abutment portion 140 against the bottom portion 41 of the bore 40 of the cylinder portion 35. While in this state, the end surface 85 of the piston 33 is spaced apart from the bottom surface 69 of the bore 40. Further, a space is formed across the whole area between the conical outer surface 70 of the protrusion 68 and the conical inner surface 86 of the recess 83, and a space is also formed across the whole area between the top surface 71 of the protrusion 68 and the spherical bottom surface 87 of the recess 83 except for the abutment protrusion 14.

According to the disk brake 11 of the above-mentioned fourth embodiment, when the caliper body 32 is mounted on a vehicle and brake fluid is supplied into the bore 40 of the caliper body 32 by vacuuming, although the piston 33 is forced to abut against the bottom portion 41 of the cylinder portion 35 by the negative pressure generated by the vacuuming, the piston 33 is preventing from adhering to the bottom portion 41 since the piston 33 abuts at the abutment protrusion 140 formed at the center of the piston 33 against the bottom portion 41. Further, for the piston 33 made of a resin material, it is possible to prevent the outer bottom 82 of the piston 33 from being damaged which might otherwise occur due to a shock from a hit at the time of the vacuuming.

Further, when brake fluid is supplied into the bore 40 of the caliper body 32 by vacuuming, it is possible to prevent the bottom portion 41 from being damaged which might otherwise occur due to a shock from a hit, since the piston 33 abuts at the attachment protrusion 140 against the thick portion of the bottom portion 41 where the protrusion 68 is formed.

The above-mentioned first to fourth embodiments employ a fist-type caliper 15 in which the cylinder 35 is disposed only at one surface side of the disk 12, the claw portion 37 is disposed at the other surface side of the disk 12, and the brake pads 14 are pressed by the single piston 33 disposed only at the one surface side of the disk 12 with use of a fluid pressure. However, the present invention may be carried out in an opposed-type caliper comprising the cylinder portions 35 at the respective surface sides of the disk 12. If the opposed-type caliper is employed in this way, the present invention can be carried out by applying friction stir welding at the cylinder portion of the pair of opposing cylinder portions where the inflow hole is formed. If necessary, friction stir welding may be applied to the cylinder portions at the both sides. Alternatively, the present invention may be carried out in a fist-type caliper or an opposed-type caliper having two or more pistons at one surface side of the disk 12. Further, in the first to fourth embodiment, the pair of brake pads 14 is disposed at the respective surface sides of the disk 12. However, the present invention can be carried out in a disk brake having two or more pairs of brake pads.

According to the disk brakes of the above-mentioned embodiments, a disk brake comprises: a pair of brake pads disposed at the respective surfaces of a disk; a piston configured to press at least one of the brake pads with the aid of a fluid pressure; and a caliper body including a cylinder portion having a bore formed therein, the piston being inserted in the bore, the cylinder portion being formed into a tubular shape, the cylinder portion having a bottom of the bore formed by integrally welding a bottom cover member fitted to an opening surrounding portion with the opening surrounding portion formed at a bottom side of the cylinder portion by friction stir welding, the bottom cover member being formed into a disk shape, the bottom cover member having a protrusion at one surface side facing the interior of the bore and an inflow hole for supplying the fluid pressure into the bore, the inflow hole being formed within the range of the protrusion so as to establish communication between the one surface and the other surface. Due to this configuration, it is possible to make friction stir welding performed from the outside of the bore with use of a welding tool easier, and improve the efficiency of manufacturing the disk brake.

According to the disk brakes of the above-mentioned embodiments, in the disk brake: the caliper body is caliper body of a fist-type caliper comprising the cylinder portion disposed at one surface side of the disk, a claw portion disposed at the other surface side of the disk, and a bridge portion extending over the disk so as to connect the claw portion and the cylinder portion; and the portion of the claw portion facing the bore of the cylinder portion is formed so as to cover the center of the cylinder portion. Due to this configuration, it is possible to enhance the strength and rigidity of the claw portion, to prevent an occurrence of brake noises due to a lack of sufficient strength of the claw portion, and therefore to improve reliability of the disk brake.

According to the disk brakes of the above-mentioned embodiments, in the disk brake: the cylinder portion is configured such that a bleeder plug is disposed at any one direction at the outer circumferential side of the bottom; and the cylinder portion includes a pair of bleeder bosses protruding outwardly, and a finish position of the friction stir welding for the formation of the bottom is set at the bleeder boss of the pair of the bleeder bosses where the bleeder plug is not disposed. Due to this configuration, it is possible to prevent a thin portion from being generated due to the remaining hole generated from the finish position of the friction stir welding. Further, a special portion for the finish position of the friction stir welding does not have to be provided at the caliper body, whereby it is possible to reduce the weight of the caliper body, and therefore the weight of the disk brake.

According to the disk brakes of the above-mentioned embodiments, the other surface of the bottom cover member is formed into a flat surface. Therefore, it is possible to make friction stir welding performed from the outside of the bore with use of a welding tool easier, and improve the efficiency of manufacturing the disk brake.

According to the disk brakes of the above-mentioned embodiments, the caliper body is made of aluminum alloy. Therefore it is possible to reduce the weight of the caliper body, and therefore the weight of the disk brake.

According to the disk brakes of the above-mentioned embodiments, in the disk brake, the piston is formed into a cup shape, and includes a recess containing the protrusion at an outer bottom of the piston. Due to this configuration, even with the protrusion at the bottom portion of the bore, it is possible to prevent an increase in the axial length of the cylinder portion and therefore prevent an increase in the axial length of the caliper, resulting in a reduction in the size of the disk brake.

According to the disk brakes of the above-mentioned embodiments, in the disk brake, the inflow hole of the bottom cover member is positioned offset from the center of the bottom cover member. Due to this configuration, it is possible to position the rotation preventing hole for a connection of a pipe near the center of the bottom cover member, and thereby reduce the diameter of the protrusion where they are formed. Therefore, it is possible to enlarge the bottom surface constituting surface to be supported by the core tool at the time of the friction stir welding, thereby ensuring the support stiffness and providing the stabilized quality of friction stir welding. Since the outer diameter of the casting of the cylinder portion does not have to be increased, it is possible to prevent an increase in the weight thereof, thereby reducing the weight of the disk brake.

According to the disk brakes of the above-mentioned embodiments, in the disk brake, the piston includes an attachment protrusion formed at the center of the piston, the attachment protrusion being configured to abut against the cylinder portion when the caliper body is mounted on a vehicle and fluid is supplied into the bore of the caliper body by vacuuming. Due to this configuration, the piston is preventing from adhering to the bottom portion of the bore. Further, for the piston made of a resin material, it is possible to prevent the outer bottom of the piston from being damaged which might otherwise occur due to a shock from a hit at the time of the vacuuming.

According to the disk brakes of the above-mentioned embodiments, a method for making a disk brake comprises: preparing a caliper body main part comprising a cylinder portion and a bridge portion, the cylinder portion having a bore the inside of which is processed by cutting, the cylinder portion being formed into a tubular shape with openings at the both sides, the bridge portion formed at the radially outer side of the cylinder portion along the axial direction thereof so as to extend over a disk; preparing a bottom cover member formed into a disk shape, the bottom cover member having a protrusion at one surface side thereof; integrally welding the bottom cover member to an opening surrounding portion formed at a bottom side of the cylinder portion by friction stir welding, with the protrusion disposed to face the interior of the cylinder portion; and forming an inflow hole at the bottom cover member welded to the caliper body main part by cutting, the inflow hole being formed within the range of the protrusion so as to establish communication between the one surface and the other surface. Due to this method, the protrusion where the inflow hole is formed is disposed in the bore, thereby making the friction stir welding performed at the outside of the bore with use of the welding tool easy, and improving the efficiency of manufacturing of the caliper.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2009-137328, filed on Jun. 8, 2009. The entire disclosure of Japanese Patent Application No. 2009-137328, filed on Jun. 8, 2009 including specification, claims, drawings and summary is incorporated herein by reference in its entirety.

What is claimed is:

1. A disk brake comprising:
a pair of brake pads disposed at the respective surfaces of a disk;
a piston configured to press at least one of the brake pads with the aid of a fluid pressure; and
a caliper body including a cylinder portion having a bore formed therein, the cylinder portion having a tubular shape and the piston being inserted in the bore,
the cylinder portion comprising:
an opening surrounding portion formed at a bottom side of the cylinder portion,
a bottom cover member fitted to the opening surrounding portion and forming a bottom of the bore, and
a welded portion integrally welding the opening surrounding portion and the bottom cover member by friction stir welding,
the bottom cover member having a protrusion at one surface side facing an interior of the bore, and an inflow hole for supplying the fluid pressure into the bore,
wherein the inflow hole is formed within the range of the protrusion so as to be positioned offset from the center of the bottom cover member and offset from the center of the protrusion to establish communication between the one surface side and the other surface side,
wherein the inflow hole is formed as a threaded hole,
wherein the piston is formed into a cup shape, and the piston defines a recess in an outer bottom portion of the piston, and the recess is concaved from an end surface of the outer bottom portion in an axial direction and configured to contain the protrusion, and
wherein, when the end surface of the outer bottom portion of the piston abuts against one surface side of the welded portion facing the interior of the bore, the protrusion is contained in the recess and a space communicated with the inflow hole is formed between the recess and the protrusion.

2. The disk brake according to claim 1, wherein:
the caliper body comprises the cylinder portion disposed at one surface side of the disk, a claw portion disposed at the other surface side of the disk, and a bridge portion extending over the disk so as to connect the claw portion and the cylinder portion; and
the portion of the claw portion facing the bore of the cylinder portion is formed so as to cover the center of the cylinder portion.

3. The disk brake according to claim 1, wherein:
the cylinder portion is configured such that a bleeder plug is disposed at any one direction at the outer circumferential side of the bottom; and
the cylinder portion includes a pair of bleeder bosses protruding outwardly, and a finish position of the friction stir welding for the formation of the bottom is set at the bleeder boss of the pair of the bleeder bosses where the bleeder plug is not disposed.

4. The disk brake according to claim 1, wherein the protrusion of the bottom cover member is disposed only at the one surface sides facing the interior of the bore.

5. The disk brake according to claim 1, wherein the bottom cover member further includes another protrusion at the other surface.

6. The disk brake according to claim 1, wherein the bottom cover member further includes a rotation preventing portion configured to be engaged with a pipe for supplying the fluid pressure into the bore.

7. The disk brake according to claim 6, wherein the rotation preventing portion comprises a rotation preventing hole formed at the other surface side of the bottom cover member.

8. The disk brake according to claim 6, wherein the rotation preventing portion comprises a rotation preventing pin disposed at the other surface side of the bottom cover member.

9. The disk brake according to claim 1, wherein the recess in the outer bottom portion of the piston includes a conical inner surface and a spherical bottom surface.

10. The disk brake according to claim 1, wherein, when the end surface of the piston abuts against the welded portion, an entire peripheral surface of the end surface of the outer bottom portion of the piston abuts against the welded portion, an entire peripheral surface of the protrusion is spaced from the recess.

11. The disk brake according to claim 1, wherein the inflow hole comprises a threaded hole extending across a whole length of the inflow hole.

* * * * *